United States Patent [19]

Kennedy

[11] 4,270,488
[45] Jun. 2, 1981

[54] SYSTEM AND APPARATUS FOR CULTIVATING AND HARVESTING OYSTERS

[76] Inventor: George D. Kennedy, Rte. 2, Box 312, Palm Bay, Fla. 32905

[21] Appl. No.: 10,079

[22] Filed: Feb. 6, 1979

Related U.S. Application Data

[63] Continuation-in-part of Ser. No. 839,125, Oct. 3, 1977, abandoned.

[51] Int. Cl.³ ............................................ A01K 61/00
[52] U.S. Cl. .......................................................... 119/4
[58] Field of Search .................................. 119/4, 3, 2

[56] References Cited

U.S. PATENT DOCUMENTS

| | | | |
|---|---|---|---|
| 239,592 | 3/1881 | Weems | 119/4 X |
| 1,815,521 | 7/1931 | Miyagi | 119/4 |
| 2,283,472 | 5/1942 | Tuxhorn | 119/3 |
| 4,137,869 | 2/1979 | Kipping | 119/4 |

*Primary Examiner*—Hugh R. Chamblee
*Attorney, Agent, or Firm*—Martin, Roger L.

[57] ABSTRACT

A shell fish cultivating and harvesting system utilizes a cultivating apparatus from which oyster cultch is suspended and which is equipped with pontoons having fore and aft compartments that are selectively blown and flooded to float and submerge the apparatus. Yieldable connections between certain components of the cultivating apparatus are used to avoid stress concentrations and the apparatus is designed to permit a shallow barge or harvesting apparatus to enter the space for the suspended oyster cultch when the apparatus is floating. The barge also utilizes spaced apart pontoons that have fore and aft compartments which may be similarly blown and flooded to change the buoyancy of the craft and thus permit it to submerge or float as the need arises.

6 Claims, 11 Drawing Figures

FIG. 1

SYSTEM AND APPARATUS FOR CULTIVATING AND HARVESTING OYSTERS

CROSS REFERENCE TO RELATED APPLICATION

This application is a continuation-in-part of my copending application Ser. No. 839,125, filed Oct. 3, 1977, now abandoned, and entitled Apparatus for Cultivating and Harvesting Float Grown Oysters.

BACKGROUND OF THE INVENTION

This invention relates to a system and apparatus for cultivating and harvesting shell fish, such as oysters.

Most oysters are recovered commercially from natural oyster reefs by relatively crude harvesting procedures that usually include the hand picking of the oysters from the reef with the use of hand manipulatable tongs but sometimes without even the aid of such equipment. Such approaches to harvesting the oysters are expensive and require considerable labor that is both grueling and fatiguing to the worker. Apart from the harvesting problems which confront the shell fish industry, many coastal waters have become polluted and this has given rise to laws and regulations which preclude the commercial recovery of the oysters from the reef habitats located in the polluted areas. All of this is leading the shell fish industry toward the adoption of commercial rather than natural cultivation procedures.

In the natural development of the mature oyster, the water borne spat seeks out an appropriate base to adhere to and thereafter develop into the mature oyster. An oyster shell per se is especially attractive as a base for such spats and this of course accounts for the development of the natural reefs. Commercially, various materials may be used as the cultch or base for attracting the spats, although oyster shells are frequently preferred. In some commercial practices, the cultch material is simply dispersed along the water bottom in the selected water area. This is not the most favorable approach to commercial cultivation of oysters however, since shifting bottom sands, sediment and mud frequently cover the cultch and render it useless for its intended purposes. Apart from this, the bottom locations for maturity of the oysters provide little opportunity to change or improve on the current harvesting procedures.

The oyster has many natural enemies, among which can be mentioned Thor's the conch, leeches, boring clams, fungus, and the encrustating organisms, such as amorphous sponges, barnacles and mussels. Apart from these enemies, there are parasites and diseases which, experience has shown, can be controlled by periodic exposure of the oyster to the air and sun, as happens naturally, for example, in some tidal waters.

To avoid the shifting sands and to provide improved harvesting procedures, there have been those who advocate suspending the cultch material from floating devices that are anchored at preselected growth areas. This approach has certain advantages, but it precludes the exposure of the oyster to the sun and air and leaves room for improving on the retrieval and harvesting procedures.

BRIEF SUMMARY OF THE INVENTION

In accord with certain aspects of the invention, provisions are made for varying the buoyancy of an aquatic apparatus for cultivating oyster and to the end that the apparatus can be selectively caused to float on the surface of the water or caused to submerge and come to rest on the bottom of the water body. The apparatus is further provided with a structural arrangement for supporting cultch material in a state of suspension such that the cultch material is located above the bottom of the water body when the aquatic apparatus is submerged, and is located above the surface of the water body when the apparatus is floating thereon. This permits the cultch to be suspended above the shifting sands and mud at the bottom of the water body when the apparatus is submerged and also permits the periodic exposure of the oysters to the sun and air for the control of parasites and diseases.

In accord with other aspects of the invention, the aquatic apparatus is provided with an opening that permits the passage of a shallow aquatic harvesting barge beneath the suspended cultch when the cultivating apparatus is floating on the surface so that the mature oysters on the cultch material can be recovered by simply removing the suspended, oyster bearing cultch material from the cultivating apparatus and in a manner such that the oysters simply fall onto the harvesting barge.

In fulfilling the objective that the cultch material be above the water surface when the cultivating apparatus is floating, it has been found that the center of buoyancy will be below the center of gravity for the cultch bearing apparatus when most conventional materials are used in the construction of the cultivating apparatus. This causes the cultch carrying apparatus to be more or less top heavy, and thus difficult to control during submergence and flotation. To overcome these tendencies, the applicant, in accord with other aspects of the invention, provides an elongated apparatus with spaced apart floats that each have forward and rear compartments and further provides a pneumatic control system such that the fore and rear compartments can be selectively blown and flooded to float and submerge the cultivating apparatus. This permits one to control the location of the center of buoyancy along the longitudinal dimension of the apparatus and facilitates maneuvering the apparatus, during its rise and fall in the water, and in a manner such as to avoid capsizing the aquatic apparatus.

Material costs and environmental conditions dictate that most materials utilized in the construction of the submersible oyster cultivating apparatus be wooden members. Such materials tend to warp in water environments and impart undue stresses to other members rigidly attached thereto, especially when the parts are subjected to the forces of underwater currents such as those that develop in areas of tide water flow. Certain aspects of the invention are accordingly directed to alleviating such stresses in the construction of such apparatuses, and as will be subsequently apparent.

A general object of the invention is to provide an improved system and apparatus for cultivating and harvesting shell fish.

Yet another object is to provide an improved oyster cultivating apparatus in which the buoyancy can be varied to permit submergence or flotation of the aquatic apparatus so as to maintain cultch material carried by the apparatus free from contact with the bottom of the water body when the aquatic apparatus is submerged and to permit the cultch material to become exposed to sun and air when the apparatus is in the floating position.

Yet another object is to provide an aquatic apparatus for harvesting oysters and which is capable of use in transporting the harvested oyster over long distances and in a generally submerged underwater environment that keeps the harvested oysters alive and fresh.

Still another object is to provide a pneumatic control arrangement for varying the buoyancy of an aquatic apparatus which in use normally has a center of gravity above that of the center of buoyancy and which permits the center of buoyancy to be shifted generally along a longitudinal dimension of the apparatus.

Still another object of the invention is to provide an arrangement for securing parts of an aquatic apparatus for cultivating oysters together and to the end that undue stresses are not imposed upon the parts when the apparatus, while submerged, is subjected to tidal flow and the like forces.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in conjunction with the accompanying drawings, in which:

DESCRIPTION OF THE INVENTION

Figure 1:
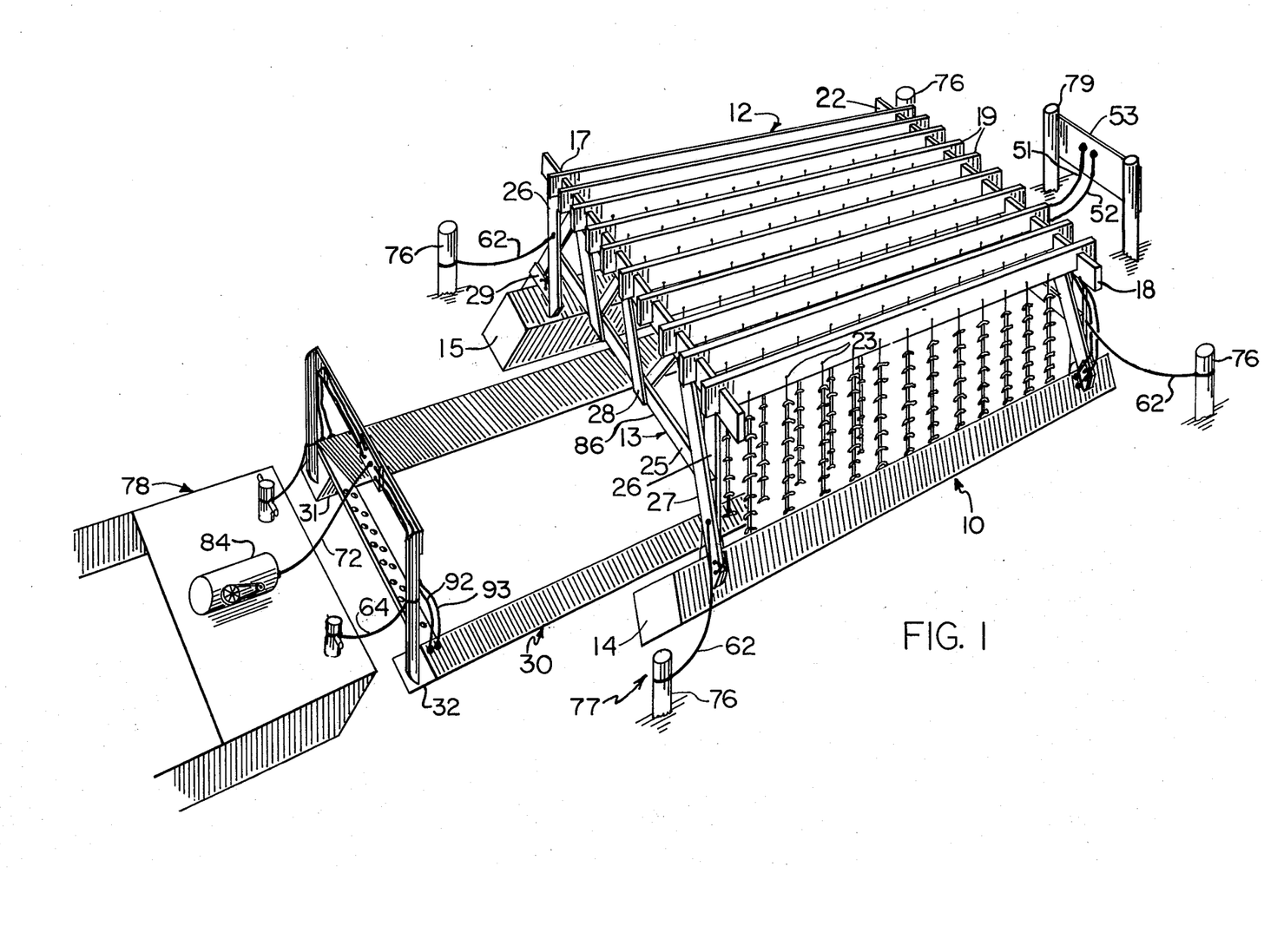
FIG. 1 is a simplified diagrammatic perspective illustration of a system embodying the principles of the invention, the figure illustrating an aquatic oyster cultivating apparatus as seen while floating on the water surface and with an aquatic oyster harvesting apparatus or barge entering the space between the floats or pontoons of the cultivating craft for purposes of receiving the oysters during the harvesting procedures, the harvesting device being seen attached to a service vehicle used in conjunction with the apparatuses.

Referrence is now made to FIG. 1 and wherein a system for cultivating, harvesting and hauling oysters is generally designated at 10. The system 10 includes an aquatic apparatus 12 for cultivating the oysters, another aquatic apparatus or barge 30 for harvesting and hauling the oysters, and a self-propelled service vehicle 78 that is used for moving the aquatic apparatuses 12 and 30 from one place to another as the need arises.

The oyster cultivating apparatus 12 is shown in FIG. 1 at a mooring 77 which may be assumed to have been established at an environmentally suitable location for cultivating the oysters. The mooring 77 includes spaced apart pilings 76 to which the apparatus 12 is moored by means of mooring lines 62. These lines are loosely arranged to permit submergence of the apparatus to a resting position on the floor of the water body without the need for adjusting the mooring lines. At the front of the apparatus 12, the mooring 77 is also equipped with a pair of spaced apart pilings 79 that are rigidly interconnected at their upper ends by a cross piece 53. This cross piece 53 serves as a panel for mounting an air control system 80 for regulating or changing the buoyancy of the cultivating apparatus 30. As will be subsequently seen, system 80 is utilized to flood and blow certain compartments of the apparatus 12 so as to facilitate the submergence and flotation thereof. The natural habitat for oysters is, of course, under water and by submerging the apparatus 12 so that it rests on the bottom of the water body, the oysters are carried above the bottom of the water body and hence free from the problems associated with shifting sands, etc. On the other hand, by floating the apparatus 12, the oysters being cultivated may be subjected to exposure to the air and sun as the needs arise for parasite and/or disease control and, of course, the apparatus is floated at the time the crop is harvested.

Figures 2, 7:
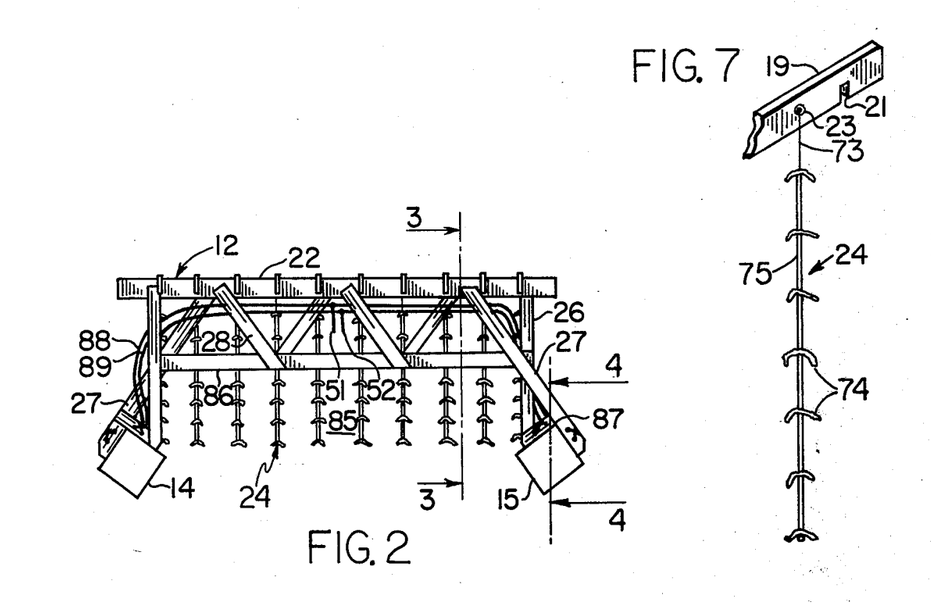
FIG. 2 is a schematic front end elevational view of the cultivating apparatus seen in FIG. 1.
FIG. 7 illustrates the arrangement utilized for suspending cultch from the cultivating apparatus.
Figure 3:
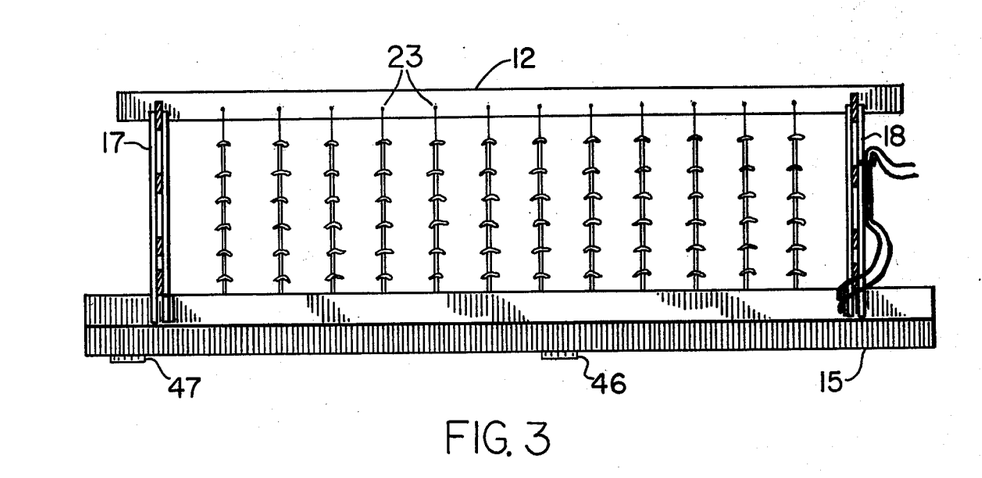
FIG. 3 is a longitudinal sectional view of the cultivating apparatus as generally seen along the Lines 3—3 of FIG. 2.

The oyster cultivating apparatus 12 is a generally elongated watercraft which is provided with a pair of elongated floats or pontoons 14 and 15 that are laterally spaced apart in parallel and located at the opposite sides of the apparatus. Rising above the pontoons 14 and 15 is a superstructure 13 from which the cultch 74 is suspended to hang in a space 85 between the pontoons. At its opposite ends, the superstructure 13 is equipped with end openings 86 so as to accommodate ingress and egress by the harvesting apparatus to the space 85 where the oysters are located and from either end of the cultivating apparatus 12.

Structurally, the superstructure 13 includes front and rear end bridging sections 17 and 18 that are transversally oriented in the assembled apparatus 12 and a plurality of elongated parallel and longitudinally arranged cultch supporting bars or members 19. These members 19 are supported at their opposite ends by the bridge sections 17 and 18.

The structures of the front and rear bridge sections 17 and 18 are rigid and are basically the same. Each section spans the distance between the pontoons 14 and 15 and has an upright leg 26 at each of its opposite ends. These legs 26 are rigidly interconnected at the top of the section by an elongated horizontally arranged cross piece 22 which, in a truss arrangement, is rigidly connected by braces 28 to a horizontally arranged and parallel cross piece 25 that interconnects the end legs 26 intermediate their upper and lower ends.

At its opposite ends, each bridge section 17 and 18 has an inwardly inclined member 27 that is suitably fixed to the cross pieces 22 and 25. Below the cross pieces 22 and 25, this member 26 is fixed by a perpendicularly arranged brace 28 to the bottom of the adjacent leg 26 and in an arrangement that provides an inverted V-shaped foot 16 at the opposite ends of each bridge section. This foot 16 is shaped to straddle the upper edge 87 of the adjacent side pontoon in the assembled apparatus.

Figures 6, 8, 10, 11:
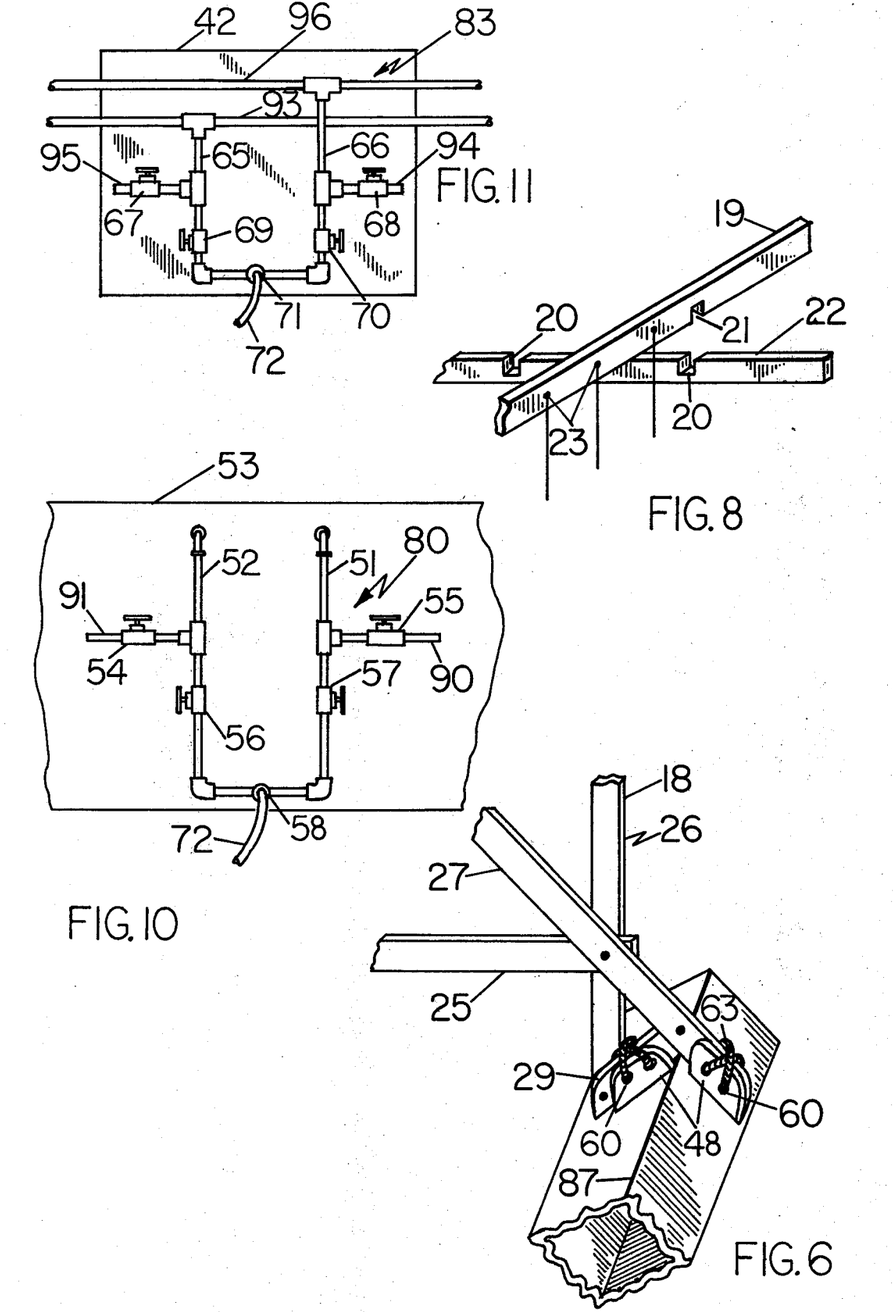
FIG. 6 is an isometric view generally illustrating the means for attaching certain parts of the cultivating apparatus to the float components thereof.
FIG. 8 illustrates an interlocking arrangement utilized between certain structural members of the cultivating apparatus so as to avoid undue stresses.
FIG. 10 generally illustrates an air control system for regulating the buoyancy of the cultivating apparatus.
FIG. 11 schematically illustrates an air control system for regulating the buoyancy of the harvesting apparatus.

As illustrated in FIG. 6, each pontoon of apparatus 12 is equipped with a pair of externally located longitudinally spaced and transversely arranged flanges 48 that are fixed to the side panels 43 at the top of the pontoon and at the foot locations for the bridge sections 17 and 18. Here, rather than being rigidly connected to the pontoons, the bridge sections are tied to the pontoons by rope ties 63 that extend through holes 60 in the flanges and through aligned apertures in the flange confronting members 27 and 29 of the bridge sections. This method of attaching the bridge sections to the floats has certain advantages. Because of the environmental conditions to which the structures are exposed, most of the structural parts, must from an economical standpoint of view, be made from conventional wood members. As such, warpage is frequently encountered, and apart from the warpage, the components are also frequently subjected to tidal currents that impart substantial forces to the underwater structural components of the apparatus. The rope ties 63 although adequate to retain the proper orientation between the bridge sections and pontoons in the aquatic apparatus 12 are nevertheless sufficiently flexible to permit the attached components to yield somewhat under forces encountered and by thus yielding avoid the concentration of large stresses in the pontoon structure and which would otherwise break or cause damage to the pontoon components of the apparatus.

As best illustrated by the exploded view shown in FIG. 8, each top cross piece 22 of the bridge sections is provided with a plurality of spaced apart upwardly opening notches 20 that are arranged to accommodate the longitudinally extending cultch support bars or members 19. The notches in each cross piece 22 are aligned with those in the cross piece of the other section and each of the bars 19 is provided with a downwardly opening notch 21 at its opposite ends. These notches are designed to permit the bar 19 to straddle the cross pieces 22 of the bridge sections 17 and 18 in an interlocking arrangement. This has certain advantages in that the notched interlock permits the bars or cultch carrier 19 to yieldably respond to warpage and stresses applied to the superstructure 13 without damage to the structural components. Apart from this, the notched interlock between the bars 19 and bridge sections facilitates removal of the cultch bars 19 to tie new cultch assemblies in place as well as to remove the bars as the need might otherwise arise.

The cultch support members 19 are provided with a plurality of spaced holes 23 that are used in suspending the cultch from the superstructure. Basically, the cultch 74 is threaded on a suitable wire or string length 73 and spaced apart in the formation of the cultch assembly 24 by short tubular lengths 75 through which the flexible member 73 extends. The string 73 of course extends through one of the holes 23 in the support members 19 and is tied in a manner such that the assembly 24 is suspended from the bar in the space 85 therebelow.

Figure 4:
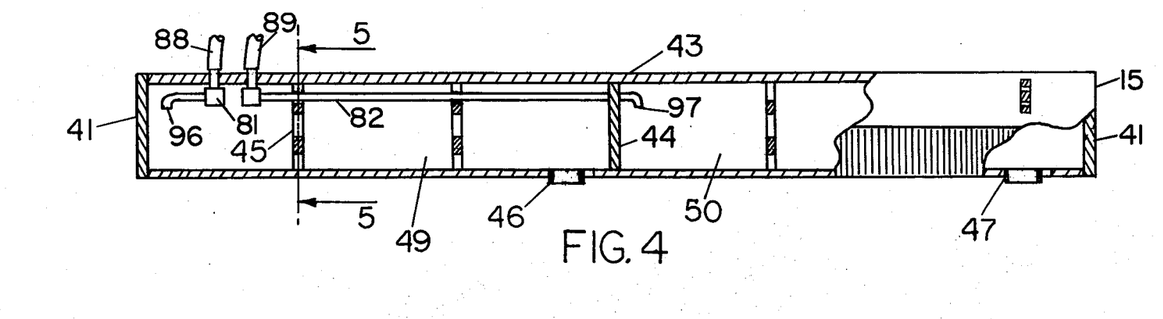
FIG. 4 is a longitudinal sectional view through one of the floats of the cultivating apparatus and as generally seen along the Lines 4—4 of FIG. 2.
Figure 5:
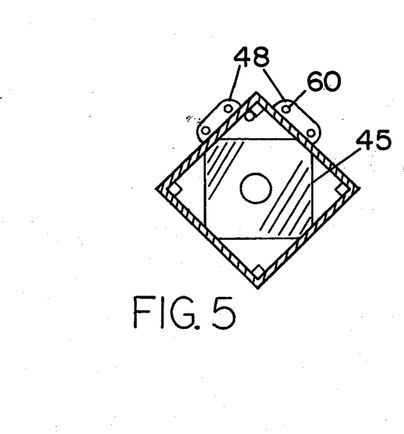
FIG. 5 is a cross sectional view through the float seen in FIG. 4 and as taken generally along the Lines 5—5 therein, with certain parts removed.

The structure of the floats or pontoons 14 and 15 is best illustrated in FIG. 4. Each pontoon is an elongated box-like component that has four elongated rectangular side panels 43 that are joined along their edges and capped at the ends by end panels 41. Between the opposite end panels 41, the interior of the float is divided into front and rear compartments 49 and 50 by a rectangular water tight bulkhead 44. Each of these compartments 49 and 50 has its own water passageways 46 and 47 that communicates with the exterior of the float along the bottom edge of the pontoon and is otherwise water tight and sealed from the other compartment. Internally, each compartment 49 and 50 is provided with a pair of longitudinally spaced apart baffles which are generally rectangular in configuration and fixed to the side panels between their longitudinal edges as seen in FIG. 5. These baffles strengthen the pontoon structure and also serve to smooth out water flow in the compartments when they are being flooded and blown as contemplated hereinafter. It may be mentioned at this point that the water passageways 46 and 47 for each compartment is located at the rear end of the compartments and at the opposite ends of the air inlet and discharge passageways 96 and 97 for the compartments.

Flooding and blowing of the compartments 49 and 50 is accomplished by pneumatic controls and each compartment has an air conduit 81 and 82 that communicates with the compartment and with the exterior of the float along the upper edge of the float. This is best illustrated in FIG. 4 and wherein it will be seen that the air conduit 82 for the rear compartments extends through the bulkhead 44 in the interior of the pontoon and extends to the exterior of the pontoon adjacent the air conduit 81 for the front compartments so as to provide adjacent locations for connecting the compartments to the pneumatic system. The air inlet and discharge passageways for compartment 49 is designated at 96 while the air inlet and discharge passageways for compartment 50 is designated at 97.

Exteriorly, the front or fore compartments 49 of pontoons 14 and 15 are interconnected by an air conduit 88. Conduit 88 is in turn connected to air conduit 51 of the pneumatic control system 80. The rear compartments 50 of pontoons 14 and 15 on the other hand, are interconnected by an air conduit 89 that, in turn, is connected to air conduit 52 of control system 80.

The air control system 80 for blowing and flooding the pontoon compartments to float and submerge the cultivating apparatus is best illustrated in FIG. 10. The system includes an air line 51 that communicates with the front compartments 49 of the pontoons 14 and 15 through line 88. This line 51 also communicates through an air valve 57 and quick disconnect air hose coupling 58 with a pressurized air source when flotation of the apparatus is desired. This is shown in FIG. 10 as being air hose 72. The system also includes air line 52 which, in this case, communicates with the rear or aft compartments 50 of the pontoons 14 and 15 via line 89. Air line 52 communicates through air valve 56 and coupling 58 with the same pressurized air source. Between valves 57 and line 88, line 51 is provided with an air bleed off line 90 that connects line 51 with the atmosphere through shut off valve 55. Line 52 is similarly provided with an air bleed off line 91 that connects the line 52 with the atmosphere through another shut off valve 54.

The service vehicle 78 in the system 10 depicted has an air compressor 84 that provides a source of pressurized air that is used in floating the cultivating apparatus 12 and it is deemed apparent that when flotation of the apparatus from a submerged position is desired, the service vehicle may be simply relocated to a position at which the discharge hose 72 may be connected to the control system 80 as shown in FIG. 10.

When the cultivating apparatus 12 is in the floating position depicted in FIG. 1, it will be appreciated that the water in the fore and aft compartments 49 and 50 of both pontoons 14 and 15 has been previously removed by blowing the compartments and that each compartment contains pressurized air so that the apparatus is buoyed up in the surface floating position. Under such circumstances, the air bleed valves 54 and 55 are closed and the air inlet valves 56 and 57 are also closed. To submerge the apparatus under such circumstances, a two step procedure is followed in which the rear compartments 50 of the pontoons 14 and 15 are first flooded and after which the front compartments 49 of the pontoons 14 and 15 are next flooded. This procedure is followed because of the low center of buoyancy and the high center of gravity that is involved when the apparatus is loaded with oyster under cultivation. Under such circumstances, the aquatic apparatus 12 tends to be unstabled. By flooding the compartments at one end of the apparatus 12 before flooding the compartments at the other end, the flooded end of the apparatus can sink into the water. This tends to stabilize the apparatus by shifting the center of buoyancy toward the floating end while the center of gravity falls lower into the water. In many cases the flooded end of the apparatus will come to rest at the floor of the water body in the chosen habitat for the cultivating procedures and will thus provide stability as the other end is submerged.

In actual operation, the apparatus is submerged by first manipulating valve 54 to the open position. This permits the air in the rear compartments 50 of the pontoons 14 and 15 to be uniformly bled off to the atmosphere. As this happens and the air in compartments 50 diminishes, water enters the compartments 50 through passageways 47. As the compartments 50 are flooded, the rear end of the apparatus 12 submerges in the water body. In most cases, the water body will be shallow enough at the selected cultivation site that the rear end will contact the floor of the water body and add stability to the apparatus. Whether this happens or not, the apparatus becomes more stable as the center of buoyancy advances longitudinally toward the front of the apparatus and the center of gravity lowers with the submergence of the aft portion of the apparatus. Once the aft compartments are flooded, valve 54 is opened to bleed the air from the front compartments 49 of both pontoons 14 and 15. As these compartments 49 are flooded with water entering through passageways 46 in the pontoons, the front portion of the apparatus becomes submerged and the apparatus can be caused to assume a bottom resting position on the floor of the water body.

At this point, it may be pointed out that the water passages 46 and 47 are at the rear end of each of the elongated compartments. This places the water inlets to the compartments at substantially the lowest point the compartments assume during the submergence process. On the other hand, the air pipes 81 and 82 communicate with compartments 49 and 50 at the opposite ends so that the air passages 96 and 97 in each compartment are at the end opposite the water inlet to the compartments. As such, the air is discharged from the compartments during the submerging procedures at substantially the highest point in the compartment during the submerging procedures.

To float apparatus 12, control system 80 is connected to a pressurized air source, such as for example, by connecting the hose 72 of the air compressor 84 to coupling 58. Under such circumstances, valves 54, 55, 56 and 57 will initially be closed and thereafter manipulated so that the front end of the apparatus is floated to the surface before the rear end. Assuming the system 80 is connected to the pressurized air source and that all valves are closed, valve 57 is opened first so as to blow the fore or front end compartments 49 of both pontoons 14 and 15. As this happens, the pressurized air admitted to the compartments 49 displaces the water through the passages 46. As this happens, the front portion of the apparatus 12 becomes more buoyant and as the center of buoyancy shifts forward the front rises from the floor of the water body. When the fore compartments 49 have been blown, valve 57 is closed and valve 56 is opened. By this manipulation of valve 56, the aft or rear compartments 50 of the pontoons 14 and 15 are pressurized and the water is blown therefrom through passageways 47. This, of course, increases the buoyancy of the apparatus and shifts the center of buoyancy longitudinally of the apparatus and toward the rear end thereof as the apparatus is floated to the surface of the water body.

This procedure is followed each time the apparatus 12 is floated for exposure of the oysters to sunlight and air and also, of course, when harvesting of the crop is desired.

Figure 9:
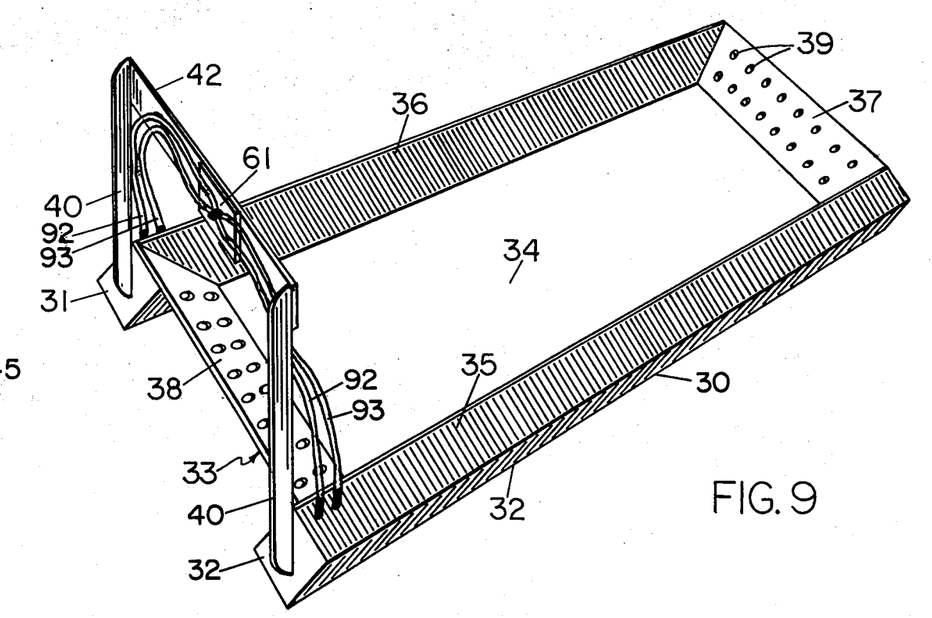
FIG. 9 is a perspective view of the aquatic apparatus or barge used in harvesting the oysters from the cultivating apparatus.

The oyster harvesting apparatus or barge 30 is best seen in FIG. 9 and includes a pair of pontoons or floats 31 and 32 which, in construction, are identical to those used in the cultivating apparatus 12. Thus, each pontoon has a forward compartment 49 and an aft compartment 50 as well as air inlet conduits 81 and 82 and water passageways 46 and 47. The front compartments of the pontoons 31 and 32 are interconnected by an air line 92 while the aft compartments are interconnected by another air line 93.

The pontoons 31 and 32 are spaced apart and therebetween support a shallow open compartment 33 in which the oysters are received during the harvesting procedures. The compartment 33 includes a flat bed or floor 34 and inclined opposite side walls 35 and 36 that overlay and are suitably fixed to the inside located upper facing side panels of the pontoons. The compartment also includes an inclined front wall 38 and an inclined rear wall 37. Walls 37 and 38 have apertures 39 so that water can freely flow over the floor 34 and any cargo being carried by the apparatus 30 if desired by adjusting the floating position of the apparatus.

The air control system 53 for adjusting the buoyancy of the craft by flooding and blowing the pontoon compartments, includes an air line 66 that communicates via line 92 with each of the fore compartments 49 in the pontoons 31 and 32. This line 66 communicates through valve 70 and air hose coupling 71 with a pressurized air source as via hose 72 to compressor 84, when the need arises for flotation of the apparatus 30. Between valve 70 and line 82, line 66 is provided with an air bleed off line 94 that communicates with the atmosphere through valve 68. The control system 83 also includes an air line 65 that communicates via line 93 with each of the aft compartments in the pontoons 31 and 32. This line 65 also communicates through valve 69 and air hose coupling 71 with the pressurized air source. Between valve 69 and line 93, line 65 is equipped with an air bleed off line 95 that communicates with the atmosphere through valve 67.

The control system 83 provides a means for flooding and blowing the fore and aft compartments 49 and 50 of the pontoons 31 and 32 so as to submerge and float the apparatus 30 as the need arises. Submergence and flotation of the apparatus 30, like that of the cultivating apparatus 12, is preferably accomplished in two steps by first flooding the aft compartments of the pontoons and thereafter flooding the fore compartments. On the other hand, one may suitably control the valves to flood both compartments simultaneously as the center of gravity under such circumstances is closer to the center of buoyancy and the craft is more stable.

When the apparatus 30 is floating at the surface of the water body, valves 67, 68,69 and 70 are normally closed. To submerge the apparatus in accord with the preferred procedure, the front compartments 49 may be first flooded, and this is accomplished simply by opening valve 68 to permit the air in the compartments to bleed off to the atmosphere. As this happens, water enters the passages 46 and floods the compartments. This, of course, causes the craft 30 to become downwardly inclined at the front end. Next, the aft compartments 50 may be flooded by simply opening valve 67 and bleeding the air from the aft compartments. As this happens, water enters the passageways 47 and the compartments become flooded. The system 83 also permits one to partially flood the fore and aft compartments as desired for example to merely lower the craft in the water and cause the water to enter the hauling compartment 33 as through the apertures 39.

When the oysters being cultivated on apparatus 12 are ready for harvesting, apparatus 12 is floated, as previously indicated, by blowing the front and aft compartments of pontoons 14 and 15. This elevates the suspended cultch bearing oysters above the water surface and the harvesting apparatus 34 may then be guided into space 85 through opening 86 to assume a position below the hanging assemblies 24. In this position, the cultch and oyster suspending strings 73 may be cut to permit the oysters to simply fall into the hauling compartment 73.

Once the compartment 73 has been loaded with oysters, the apparatus 30 is withdrawn from the space 85 through the use of the service vehicle 78 which is connected to the apparatus as seen in the figures by line 64. The harvesting apparatus 30 may now be moved to unloading facilitates at shore or if storage of the oysters is desired, the apparatus 30 may be moved to a suitable location and submerged by flooding the compartments in the pontoons 31 and 32 to provide a proper habitat for the storage of the crop.

While only one embodiment of this invention has been shown and described by way of illustration, many modifications will occur to those skilled in the art and it is, therefore, desired that it be understood that it is intended herein to cover all such modifications that fall within the true spirit and scope of this invention.

What is claimed as new and what it is desired to secure by Letters Patent of the United States is:

1. A system for cultivating and harvesting oysters comprising an aquatic oyster cultivating apparatus having a pair of elongated pontoons that are laterally spaced apart and arranged in parallel, and a superstructure that is supported by said pontoons for suspending cultch material in the space between the pontoons, and a system for floating and submerging the cultivating apparatus, said superstructure being arranged to support the cultch material above the water surface when said apparatus is floating thereon and to support the cultch material above the water bottom when the apparatus is submerged and resting thereon, each of said pontoons having an elongated fore compartment and an elongated aft compartment, and said floating and submerging system having an air control system that is connected to the fore compartments of said pontoons and controllable to simultaneously flood or blow said fore compartments and further connected to the aft compartments of said pontoons and controllable to simultaneously flood or blow said aft compartments, said superstructure comprising a section bridging the space between said pontoons, said section having a pair of foot portions that straddle the respective pontoons, and said cultivating apparatus comprises flexible means engaging said foot portions and yieldably securing said section to said pontoons.

2. A system for cultivating and harvesting oysters in accord with claim 1 further comprising an aquatic oyster harvesting apparatus, and wherein said superstructure has an opening into the space between said pontoons for ingress and egress of said harvesting apparatus.

3. A system for cultivating and harvesting oysters in accord with claim 2 wherein said harvesting apparatus has a pair of compartmented pontoons, and the system further comprising a system for floating and submerging the harvesting apparatus that includes an air control system which is connected to the compartments of said pair of compartmented pontoons for flooding and blowing the compartments thereof.

4. A system for cultivating and harvesting oysters comprising an aquatic oyster cultivating apparatus having a pair of elongated pontoons that are laterally spaced apart and arranged in parallel, and a superstructure that is supported by said pontoons for suspending cultch material in the space between the pontoons, and a system for floating and submerging the cultivating apparatus, said superstructure being arranged to support the cultch material above the water surface when said apparatus is floating thereon and to support the cultch material above the water bottom when the apparatus is submerged and resting thereon, each of said pontoons having an elongated fore compartment and an elongated aft compartment, and said floating and submerging system having an air control system that is connected to the fore compartments of said pontoons and controllable to simultaneously flood or blow said fore compartments and further connected to the aft compartments of said pontoons and controllable to simultaneously flood or blow said aft compartments, said superstructure comprising a pair of bridge sections that are spaced apart from each other and bridge the space between said pontoons, flexible means yieldably securing said sections to said pontoons, and a plurality of spaced apart members from which the cultch material is suspended in the space between said pontoons, each of said members being arranged to rest on and span the space between said bridge sections.

5. A system for cultivating and harvesting oysters comprising an aquatic oyster cultivating apparatus having a pair of elongated pontoons that are laterally spaced apart and arranged in parallel, and a superstructure that is supported by said pontoons for suspending cultch material in the space between the pontoons, and a system for floating and submerging the cultivating apparatus, said superstructure being arranged to support the cultch material above the water surface when said apparatus is floating thereon and to support the cultch material above the water bottom when the apparatus is submerged and resting thereon, each of said pontoons having an elongated fore compartment and an elongated aft compartment, and said floating and submerging system having an air control system that is connected to the fore compartments of said pontoons and controllable to simultaneously flood or blow said fore compartments and further connected to the aft compartments of said pontoons and controllable to simultaneously flood or blow said aft compartments, each of said fore and aft compartments having a water passageway that communicates with the exterior of the pontoons and an air inlet and discharge passageway, said air control system being connected to the inlet and discharge passageways of the fore compartments of the pontoons and controllable to simultaneously admit water to or discharge water from such fore compartments through the water passageways thereof, and said air control system being further connected to the inlet and discharge passageways of the aft compartments of the pontoons and controllable to simultaneously admit water to or discharge water from such aft compartments through the water passageways thereof.

6. A system for cultivating and harvesting oysters comprising an aquatic oyster cultivating apparatus having a pair of elongated pontoons that are laterally spaced apart and arranged in parallel, and a superstructure that is supported by said pontoons for suspending cultch material in the space between the pontoons, and a system for floating and submerging the cultivating apparatus, said superstructure being arranged to support the cultch material above the water surface when said apparatus is floating thereon and to support the cultch material above the water bottom when the apparatus is submerged and resting thereon, each of said pontoons having an elongated fore compartment and an elongated aft compartment, and said floating and submerging system having an air control system that is connected to the fore compartments of said pontoons and controllable to simultaneously flood or blow said fore compartments and further connected to the aft compartments of said pontoons and controllable to simultaneously flood or blow said aft compartments, said superstructure comprising a pair of bridging sections that are spaced apart from each other and bridge the space between said pontoons, flexible means yieldably securing said bridging sections to said pontoons, and a plurality of spaced apart members from which the cultch material is suspended, each of said members being arranged to rest on and span the space between said bridge sections, each of the cultivating apparatus pontoon compartments having a water passageway located at one end of the compartment and an air inlet and discharge passageway located at the other end of the compartment, said air control system being connected to the inlet and discharge passageways of the fore compartments of the cultivating apparatus pontoons and controllable to simultaneously admit water to or discharge water from such fore compartments through the water passageways thereof, and said air control system being further connected to the inlet and discharge passageways of the aft compartments of the cultivating apparatus pontoons and controllable to simultaneously admit water to or discharge water from such aft compartments through the water passageways thereof.

* * * * *